United States Patent
Chromy et al.

(10) Patent No.: US 11,473,784 B2
(45) Date of Patent: Oct. 18, 2022

(54) REFILLING DEVICE FOR A HYDRONIC HEATING SYSTEM AND METHOD OF OPERATING

(71) Applicant: Ademco Inc., Golden Valley, MN (US)

(72) Inventors: Ivo Chromy, Rajhrad (CZ); Jasa Zdenek, Brno (CZ); Pascal Joos, Bad Rappenau (DE); Steffen Raule, Eberbach (DE); Josef Hladky, Rudikov (CZ); Ondrej Pavelka, Brno (CZ); Patrick Neureither, Mosbach (DE)

(73) Assignee: Ademco Inc., Golden Valley, MN (US)

( * ) Notice: Subject to any disclaimer, the term of this patent is extended or adjusted under 35 U.S.C. 154(b) by 519 days.

(21) Appl. No.: 16/562,131

(22) Filed: Sep. 5, 2019

(65) Prior Publication Data

US 2020/0080728 A1 Mar. 12, 2020

(30) Foreign Application Priority Data

Sep. 6, 2018 (EP) ..................................... 18192979

(51) Int. Cl.
*F24D 3/10* (2006.01)
*F24D 19/10* (2006.01)
(Continued)

(52) U.S. Cl.
CPC ......... *F24D 3/1083* (2013.01); *B01D 1/0082* (2013.01); *E03C 1/122* (2013.01);
(Continued)

(58) Field of Classification Search
CPC .............. C02F 2209/05; C02F 2209/40; C02F 2209/06; C02F 2209/005; C02F 2209/10;
(Continued)

(56) References Cited

U.S. PATENT DOCUMENTS

| 5,895,565 A * | 4/1999 | Steininger ............... C02F 1/008 210/85 |
| 2009/0123340 A1* | 5/2009 | Knudsen ................ G01N 33/18 73/61.41 |

(Continued)

FOREIGN PATENT DOCUMENTS

| CN | 102788383 A | 11/2012 |
| CN | 103533195 A | 1/2014 |

(Continued)

OTHER PUBLICATIONS

Extended Search Report from counterpart European Application No. 18192979.5, dated Mar. 15, 2019, 8 pp.

(Continued)

*Primary Examiner* — Atif H Chaudry
(74) *Attorney, Agent, or Firm* — Shumaker & Sieffert, P.A.

(57) ABSTRACT

Refilling device for a hydronic heating system, having a monolithic housing providing an inlet port, an outlet port, a middle section providing a flow channel for water extending between the inlet port and the outlet port and a connection socket for a softening and/or demineralization cartridge, having an inlet shut-off-valve accommodated within said monolithic housing downstream of said inlet port, having an automatically actuated outlet shut-off-valve accommodated within said monolithic housing upstream of said outlet port, having a system separator with backflow preventers, a conductivity or TDS sensor and a flow meter accommodated within said monolithic housing, and having a controller mounted to said monolithic housing, wherein the controller receives signals from the conductivity or TDS sensor and from the flow meter, wherein the controller processes said signals received from said sensors to automatically control the operation of the refilling device.

20 Claims, 4 Drawing Sheets

(51) Int. Cl.
*F24D 3/02* (2006.01)
*F24D 19/08* (2006.01)
*F24D 19/00* (2006.01)
*B01D 1/00* (2006.01)
*E03C 1/122* (2006.01)

(52) U.S. Cl.
CPC .............. *F24D 3/02* (2013.01); *F24D 3/1066* (2013.01); *F24D 19/0092* (2013.01); *F24D 19/083* (2013.01); *F24D 19/088* (2013.01); *F24D 19/1015* (2013.01); *F24D 19/1036* (2013.01); *C02F 2209/005* (2013.01); *C02F 2209/05* (2013.01); *C02F 2209/06* (2013.01); *C02F 2209/10* (2013.01); *C02F 2209/40* (2013.01); *F24D 2220/025* (2013.01); *F24D 2220/0271* (2013.01); *F24D 2220/042* (2013.01); *F24D 2220/044* (2013.01); *F24D 2220/046* (2013.01); *F24D 2220/2009* (2013.01); *F24D 2240/00* (2013.01)

(58) Field of Classification Search
CPC ............... F24D 3/1083; F24D 19/0092; F24D 2220/0271; F24D 2220/042; F24D 2220/044; F24D 2220/046; F24D 2220/025; B01D 1/0082
See application file for complete search history.

(56) References Cited

U.S. PATENT DOCUMENTS

| | | | |
|---|---|---|---|
| 2015/0183672 A1* | 7/2015 | Washburn | ............... C02F 1/008 210/85 |
| 2018/0058704 A1 | 3/2018 | Lewis | |
| 2020/0080729 A1 | 3/2020 | Chromy et al. | |

FOREIGN PATENT DOCUMENTS

| | | | | |
|---|---|---|---|---|
| CN | 203642537 U | 6/2014 | | |
| CN | 104801099 A | 7/2015 | | |
| CN | 106123111 A | 11/2016 | | |
| CN | 106485304 A | 3/2017 | | |
| CN | 106813400 A | 6/2017 | | |
| DE | 102009052728 A1 | * | 5/2011 | ......... F24D 19/0092 |
| DE | 102009052728 A1 | | 5/2011 | |
| DE | 202010008759 U1 | | 1/2012 | |
| DE | 202010008759 U1 | * | 3/2012 | ............. E03B 7/074 |
| DE | 202014103898 U | | 11/2015 | |
| DE | 202014103898 U1 | * | 12/2015 | ................ C02F 1/42 |
| DE | 202015101006 U1 | * | 6/2016 | |
| EP | 2778560 A1 | | 9/2014 | |
| EP | 3029388 A1 | | 6/2016 | |
| JP | 2015183966 A | | 10/2015 | |

OTHER PUBLICATIONS

Honeywell, "NK300S," Product Specification Sheet ENOH-1556GE23, 2017, 6 pp. (Applicant points out, in accordance with MPEP 609.04(a), that the year of publication, 2017, is sufficiently earlier than the effective U.S. filing date, so that the particular month of publication is not in issue.).

Honeywell, "NK300SE-SO," Product Specification Sheet ENOH-1560GE23, 2017, 5 pp. (Applicant points out, in accordance with MPEP 609.04(a), that the year of publication, 2017, is sufficiently earlier than the effective U.S. filing date, so that the particular month of publication is not in issue.).

Honeywell, "VE300S," Product Specification Sheet ENOH-1654GE23, 2017, 4 pp. Applicant points out, in accordance with MPEP 609.04(a), that the year of publication, 2017, is sufficiently earlier than the effective U.S. filing date, so that the particular month of publication is not in issue.).

* cited by examiner

REFILLING DEVICE FOR A HYDRONIC HEATING SYSTEM AND METHOD OF OPERATING

This application claims priority from European Patent Application No. 18192979.5, filed Sep. 6, 2018, and entitled, "Refilling device for a hydronic heating system and method of operating." The entire content of European Patent Application No. 18192979.5 is incorporated herein by reference.

The present patent application relates to a refilling device for a hydronic heating system and to a method of operating the refilling device.

The product leaflet "NK300SE-SO, Refilling combination with heatwater treatment unit and softening cartridge, ENOH-1560GE23 R0117, Honeywell GmbH, year 2017" discloses a refilling device for a hydronic heating system. The refilling device known from that product leaflet is a combination of two separate sub-devices, namely of a refilling combination known from the product leaflet "NK300S, Refilling combination, ENOH-1556GE23 R0117, Honeywell GmbH, year 2017" and of a heatwater treatment unit known from the product leaflet "VE300S, Heatwater treatment unit, ENOH-1564GE23 R0117, Honeywell GmbH, year 2017". The refilling combination and the heatwater treatment unit each have a separate housing. The housing of the refilling combination has an inlet port and an outlet port. The housing of heatwater treatment unit has also an inlet port and an outlet port. When assembling the refilling device the inlet port of the housing of the heatwater treatment unit is connected to the outlet port of the refilling combination. The housing of the refilling combination accommodates two manually actuated shut-off-valves, a backflow preventer, a pressure reducing valve and a pressure gauge. The housing of the heatwater treatment unit provides a connection socket for a softening and/or demineralization cartridge and accommodates another manually actuated shut-off-valve. The heatwater treatment unit has a controller to simplify exchange of the softening and/or demineralization cartridge.

DE 20 2014 103 898 U1 discloses a heatwater treatment unit having a housing accommodating two manually actuated shut-off-valves, a system separator having two backflow preventers, a pressure reducing valve and a flow meter.

Against this background a novel refilling device for a hydronic heating system is provided. The refilling device for a hydronic heating system according to the invention is defined in the claim 1.

The refilling device according to the invention comprises a monolithic housing providing an inlet port, an outlet port, a middle section providing a flow channel for water extending between the inlet port and the outlet port and a connection socket for a softening and/or demineralization cartridge. The refilling device is connectable to a water supply pipe of a water supply system through said inlet port. The refilling device is connectable to a water supply pipe of a hydronic heating system through said outlet port.

The refilling device according to the invention further comprises an inlet shutoff-valve at least partially accommodated within said monolithic housing downstream of said inlet port.

The refilling device according to the invention further comprises an automatically actuated outlet shut-off-valve at least partially accommodated within said monolithic housing upstream of said outlet port.

The refilling device according to the invention further comprises a system separator having backflow preventers at least partially accommodated within said monolithic housing.

The refilling device according to the invention further comprises at least a conductivity or TDS sensor and a flow meter all at least partially accommodated within said monolithic housing.

The refilling device according to the invention further comprises a controller mounted to said monolithic housing. Said controller receives signals from the conductivity or TDS sensor and from the flow meter. The controller processes said signals received from said sensors to automatically control the operation of the refilling device.

The refilling device according to the invention provides a high degree of automatization. The signals provided by the conductivity or TDS sensor and by the flow are used to automatically control the operation of the refilling device.

Preferably, the refilling device according to the invention further comprises a pressure sensor at least partially accommodated within said monolithic housing, wherein the controller receives signals also from the pressure sensor, and wherein the controller processes also the signals received from the pressure sensor to automatically control the operation of the refilling device. This allows for a higher degree of automatization.

Preferably the pressure sensor measures the pressure within the outlet port through which the refilling device is connectable to the water supply pipe of the hydronic heating system. The controller receives said pressure signal from the pressure sensor. The controller controls the operation of the refilling device on basis of said pressure signal is such a way that the controller automatically opens the automatically actuated outlet shut-off-valve when the said pressure signal from the pressure sensor is below a threshold, and automatically closes the automatically actuated outlet shut-off-valve when the said pressure signal from the pressure sensor is above the threshold. Refilling of the hydronic heating system can be automated.

Preferably, the refilling device according to the invention further comprises a temperature sensor at least partially accommodated within said monolithic housing, wherein the controller receives signals also from the temperature sensor, and wherein the controller processes also the signals received from the temperature sensor to automatically control the operation of the refilling device. This allows for a higher degree of automatization.

Preferably, a first conductivity or TDS sensor is at least partially accommodated within said monolithic housing downstream of said inlet shut-off-valve and upstream of said system separator. The temperature sensor is at least partially accommodated within said monolithic housing downstream of said inlet shut-off-valve, preferably between the backflow preventers of the system separator. The controller determines from the signal provided by the first conductivity or TDS sensor and preferably from the signal provided by the temperature sensor the hardness and/or mineralization of the water upstream of the connection socket.

Preferably, a second conductivity or TDS sensor is at least partially accommodated within said monolithic housing downstream of said connection socket for the softening and/or demineralization cartridge and upstream of said automatically actuated outlet shut-off-valve. The controller determines from the signal provided by the second conductivity or TDS sensor and preferably from the signal provided by the temperature sensor the hardness and/or mineralization of the water downstream of the connection socket. On basis of the determined hardness and/or mineralization of the water upstream of the connection socket and downstream of the connection socket the controller may automatically control the operation of the refilling device. The controller may automatically close the automatically actuated outlet shut-off-valve on basis of the hardness and/or mineralization of the water upstream of the connection socket and/or on basis of the hardness and/or mineralization of the water downstream of the connection socket. Refilling of the hydronic heating system can be further automated. Preferably, a softening and/or demineralization cartridge is connected to said connection socket. The softening and/or demineralization cartridge has a RFID or NFC tag storing data about the softening and/or demineralization cartridge. The controller receives said data from said RFID or NFC tag. The controller processes said data received from said RFID or NFC tag to automatically control the operation of the refilling device. Refilling of the hydronic heating system can be further automated.

Preferably, the controller determines from the signal provided by flow meter the amount of water refilled into the hydronic heating system as a function of time. The controller determines a leakage the hydronic heating system if the amount of refilled water in a defined time period is above a threshold. In case of a leakage controller may automatically close the automatically actuated outlet shutoff-valve. Refilling of the hydronic heating system can be further automated.

The method of operating the refilling device is defined in claim 16.

Preferred developments of the invention are provided by the dependent claims and the description which follows. Exemplary embodiments are explained in more detail on the basis of the drawing, in which:

FIG. 1 a detail of a hydronic heating system having a refilling device according to the present application;

Figure 1:
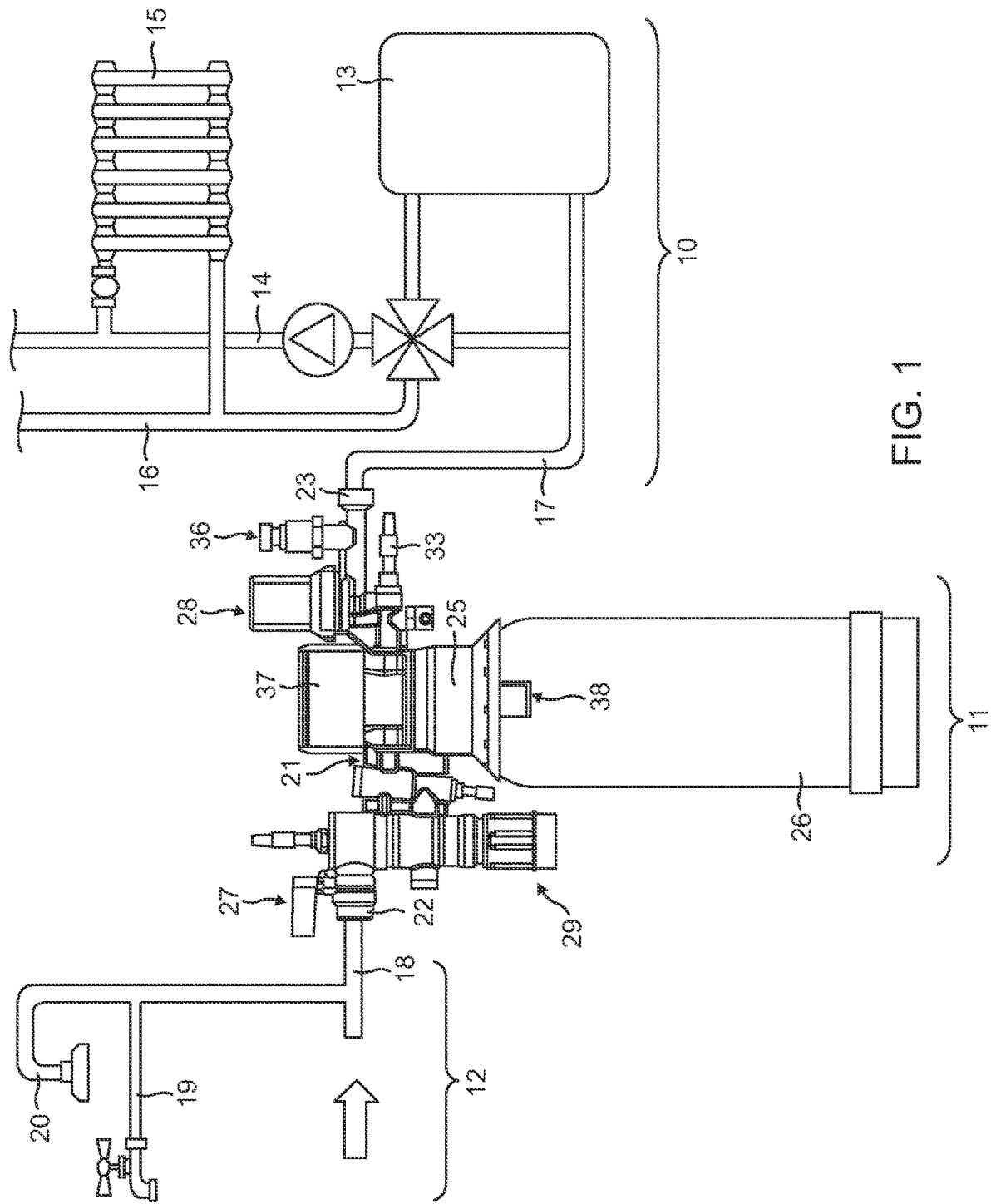
Figure 2:
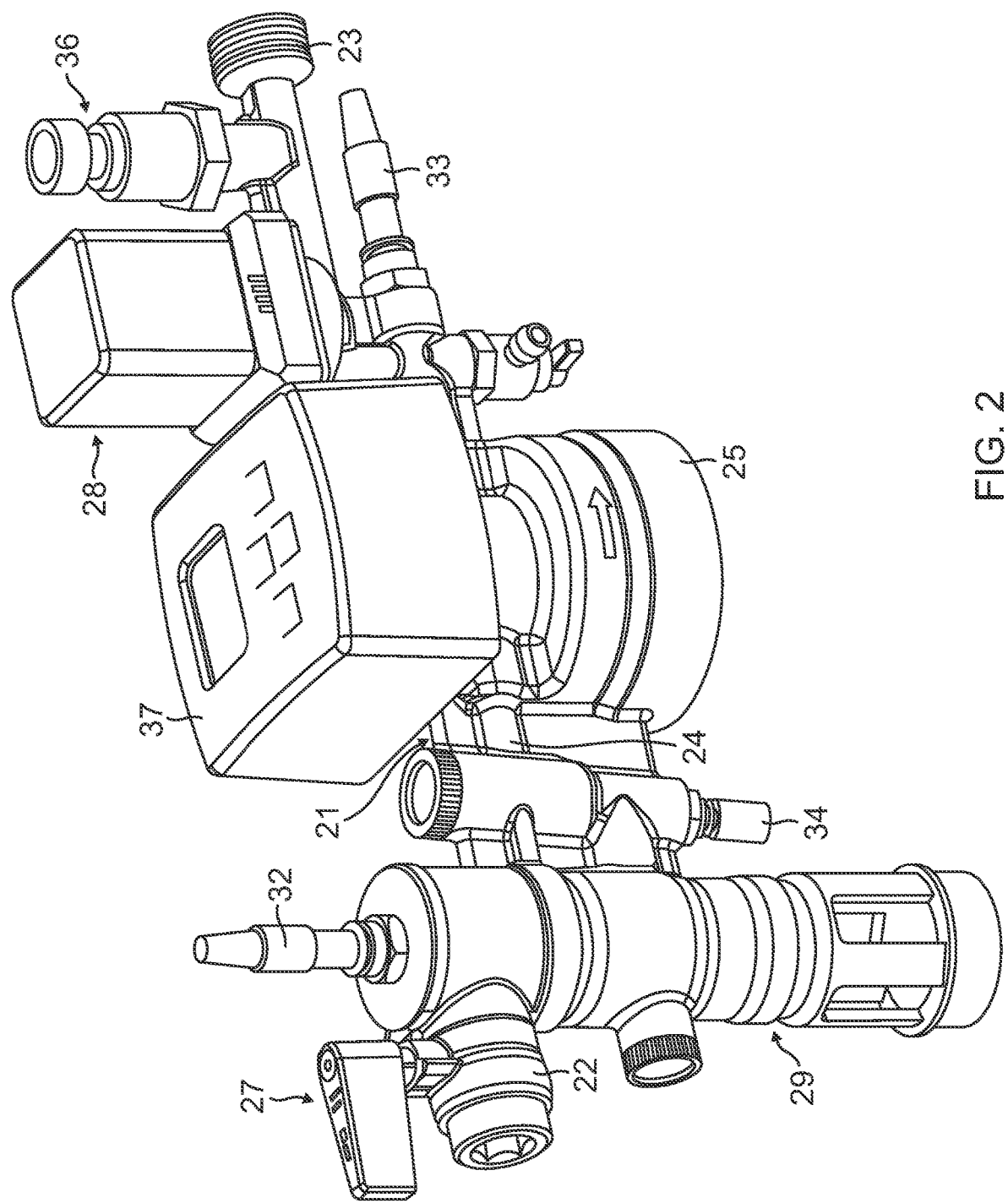
FIG. 2 shows a perspective view of the refilling device.
Figure 3:
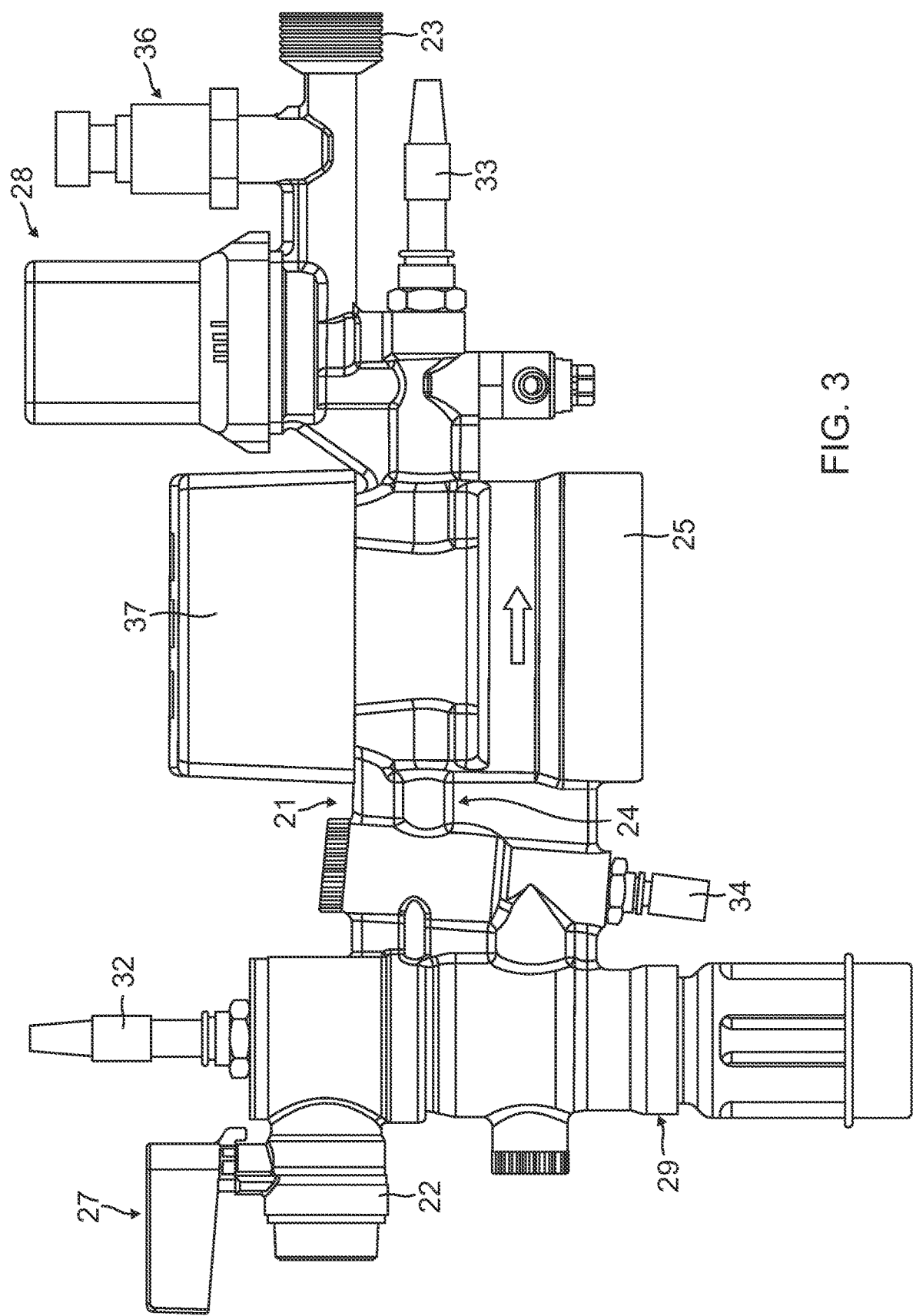
FIG. 3 shows a side view of the refilling device.

FIG. 1 shows a detail of a hydronic heating system 10 having a refilling device 11 which is used to automatically refill the hydronic heating system 10 with water, namely heating water, provided by a water supply system 12 and to treat, namely soften and/or demineralize, the water provided by the water supply system 12 before filling the same into the hydronic heating system 10.

The hydronic heating system 10 comprises a burner 13 to heat the heating water, a supply pipe 14 to provide the heated heating water to radiators 15 and a return pipe 16 to return the heating water from the radiators 15 back to the burner thereby providing a closed heating loop.

The refilling device 11 is connected to a water supply pipe 17 of the hydronic heating system 10 and to a water supply pipe 18 of the water supply system 12. The water supply system 12 provides drinking water to water consumers like a water tap 19 or a shower 20.

The refilling device 11 has a monolithic housing 21 providing an inlet port 22, an outlet port 23, a middle section 24 providing a flow channel for water extending between the inlet port 22 and the outlet port 23, and a connection socket 25 for a softening and/or demineralization cartridge 26.

The refilling device 11 is connectable to the water supply pipe 18 of the water supply system 12 through said inlet port 22. The refilling device is connectable to the water supply pipe 17 of a hydronic heating system 10 through said outlet port 23.

The refilling device 11 further has an inlet shut-off-valve 27 accommodated within said monolithic housing 21 downstream of said inlet port 22. The inlet shut-off-valve 27 is preferably manually actuated.

The refilling device 11 further has an automatically actuated outlet shut-off-valve 28 accommodated within said monolithic housing 21 upstream of said outlet port 23. The automatically actuated outlet shut-off-valve 28 is preferably a solenoid valve.

The refilling device 11 further has a system separator 29 having two backflow preventers 30, 31 accommodated within said monolithic housing 21, namely an inlet backflow preventer 30 and an outlet backflow preventer 31. The system separator 29 prevents that water flows back from the hydronic heating system 10 into the water supply system 12. The two backflow preventers 30, 31 are connected in series. The water must flow through both backflow preventers.

The refilling device 11 has at least a one conductivity or TDS sensor 32, 33 and a flow meter 35 all accommodated within said monolithic housing 21. In The shown, preferred embodiment, the refilling device 11 has a first conductivity or TDS sensor 32, a second conductivity or TDS sensor 33, a temperature sensor 34, a flow meter 35 and a pressure sensor 36 all accommodated within said monolithic housing 21.

The inlet shut-off-valve 27 is accommodated within said monolithic housing 21 immediately downstream of said inlet port 22.

The system separator 29 having the two backflow preventers 30, 21 is accommodated within said monolithic housing 21 downstream of said inlet shut-off-valve 27.

The connection socket 25 for the softening and/or demineralization cartridge 26 is provided by said monolithic housing 21 downstream of said system separator 29.

The automatically actuated outlet shut-off-valve 28 is accommodated within said monolithic housing 21 downstream of said connection socket 25 for the softening and/or demineralization cartridge 26.

The pressure sensor 36 is accommodated within said monolithic housing 31 downstream of said automatically actuated outlet shut-off-valve 28 and upstream of said outlet port 23.

Figure 4:
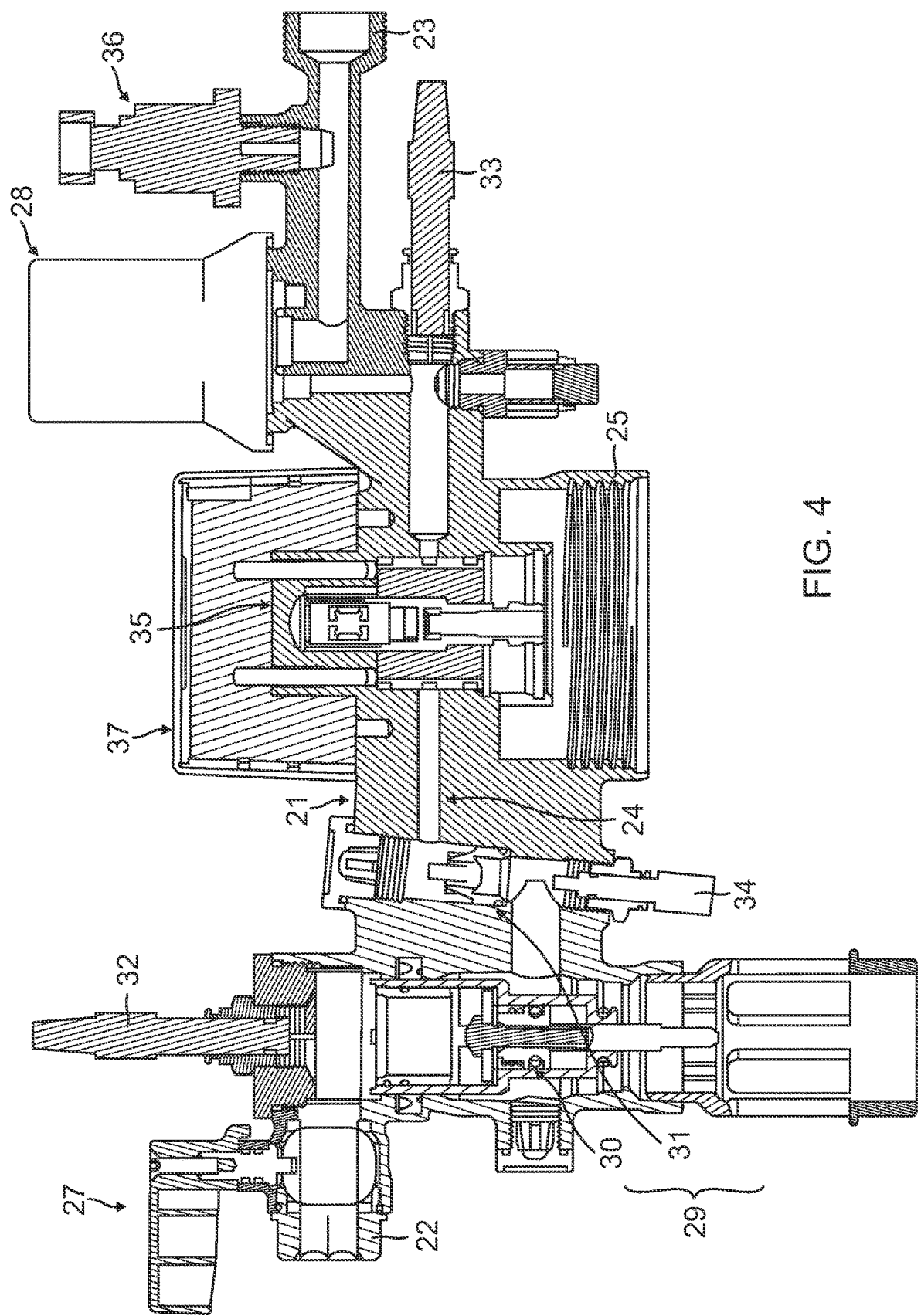
FIG. 4 shows a cross section of the refilling device.

The flow meter 35 (which is only partially visible in FIG. 4) is positioned in the region of or within said connection socket 25 for the softening and/or demineralization cartridge 26.

The first conductivity or TDS sensor 32 is accommodated within said monolithic housing 21 downstream of said inlet shut-off-valve 27 and up-stream of said system separator 29.

The temperature sensor 34 is accommodated within said monolithic housing 21 downstream of said manually actuated outlet shut-off-valve 27, preferably between the two backflow preventers 30, 31 of the system separator 29.

The second conductivity or TDS sensor 33 is accommodated within said monolithic housing 21 downstream of said connection socket 25 for the softening and/or demineralization cartridge 26 and upstream of said automatically actuated outlet shut-off-valve 28.

The refilling device 11 further has a controller 37 mounted to said monolithic housing 21.

The controller 37 receives signals from the respective conductivity or TDS sensor 32, 33, preferably from the temperature sensor 34, from the flow meter 35 and preferably from the pressure sensor 36. The controller 37 processes said signals received from said sensors 32, 33, 34, 35, 36 to automatically control the operation of the refilling device 11.

The pressure sensor 36 measures the pressure within the outlet port 23 through which the refilling device 11 is connectable to the water supply pipe 17 of the hydronic heating system 10. The controller 37 receives said pressure signal from the pressure sensor 36.

The controller 37 controls the operation of the refilling device 11 on basis of said pressure signal in such a way that the controller 37 automatically opens the automatically actuated outlet shut-off-valve 28 when the said pressure signal from the pressure sensor 36 is below a threshold, and automatically closes the automatically actuated outlet shut-off-valve 28 when the said pressure signal from the pressure sensor 36 is above the threshold. The refilling is automated by the controller 23 which automatically opens and closes the outlet shut-off-valve 28 on basis of the signal of the pressure sensor 36. No manual refilling is necessary. The inlet shut-off-valve 27 may be permanently opened.

The controller 37 determines from the signal provided by the first conductivity or TDS sensor 32 and preferably from the signal provided by the temperature sensor 34 the hardness and/or mineralization of the water upstream of the connection socket 25, so the hardness and/or mineralization of the water which still need to be treated by the softening and/or demineralization cartridge 26.

The controller 37 determines from the signal provided by the second conductivity or TDS sensor 33 and preferably from the signal provided by the temperature sensor 34 the hardness and/or mineralization of the water downstream of the connection socket 25, so the hardness and/or mineralization of the water which has been treated by the softening and/or demineralization cartridge 26.

The hardness (also often called dGH) of the water may be calculated from the value provided by the TDS sensor as follows: $dGH = ppm\ TDS \times 0.056$.

This value is preferably compensated on basis of the temperature value provided by the temperature sensor 34. With reduced accuracy the hardness of the water may be determined from the value provided by the TDS sensor only, meaning without temperature compensation.

The following should be noted regarding the use of the conductivity or TDS sensors 32, 33. If a cartridge 26 is used which can provide demineralization of the water, a changing mineralization of the water can be determined by the use of said TDC sensors positioned upstream and downstream of the cartridge 26. However, if a cartridge 26 is used which does not provide demineralization of the water but softening of the water only, then the electrical conductivity of the water will not be changed because the number of ions in the water causing the electrical conductivity is not changed by the softening cartridge. In this case, it would in principle be possible to determine hardness and mineralization of the water both upstream and downstream of the cartridge 26, however the measurement values should not change because the electrical conductivity of the water is not changed by a softening cartridge 26. If in this case measurement values would differ from each other by a value being greater than a threshold, then it may be detected that one of the conductivity or TDS sensors 32, 33 may have a malfunction.

The controller 37 automatically closes the automatically actuated outlet shut-off-valve 28 on basis of the hardness and/or mineralization of the water upstream of the connection socket 25 and/or on basis of the hardness and/or mineralization of the water downstream of the connection socket 25. In this regard, the controller 37 may automatically close the outlet shut-off-valve 28 if the hardness and/or mineralization of the water downstream of the connection socket is not within a defined range.

A softening and/or demineralization cartridge 26 is connected to the connection socket 25 of the housing 11. The softening and/or demineralization cartridge 26 has a RFID or NFC tag 38 storing data about the softening and/or demineralization cartridge 26, e.g. data about type and/or size and/or capacity of the cartridge 26. The controller 37 receives said data from said RFID or NFC tag 28. The controller 37 processes said data received from said RFID or NFC tag 28 to automatically control the operation of the refilling device 11.

The controller 37 determines from the hardness and/or mineralization of the water upstream of the connection socket 25 and from the said data received from said RFID or NFC tag 38 a nominal amount of water which can be softened and/or demineralized by the softening and/or demineralization cartridge 26. The controller 37 determines from the signal provided by the flow meter 25 an actual amount of water which has been softened and/or demineralized by the softening and/or demineralization cartridge 26.

The controller 37 may automatically generate a warning signal if the difference between said nominal amount and said actual amount becomes smaller than a threshold. The controller 37 may show that warning massage on a display of the controller 37 in order to initiate a replacement of the softening and/or demineralization cartridge 26. Further on, the controller 37 may automatically close the outlet shut-off-valve 28 when the difference between said nominal amount and said actual amount becomes smaller than a threshold.

The difference between said nominal amount and said actual amount corresponds to the remaining capacity of the softening and/or demineralization cartridge 26. The controller 37 may send the remaining capacity of the softening and/or demineralization cartridge 26 to the RFID or NFC tag 38 for storage within the RFID or NFC tag 38.

Further on, the controller 37 may determine from the data received from said RFID or NFC tag 38 if the correct type of softening and/or demineralization cartridge 26 is used.

If the use of a wrong softening and/or demineralization cartridge 36 is determined by the controller 37, the controller 37 may automatically close the automatically actuated outlet shut-off-valve 28.

The controller 37 determines from the signal provided by flow meter 35 the amount of water refilled into the hydronic heating system 11 as a function of time. E.g. frequency of refilling and the amount of the refilled water is monitored as a function of time. The controller 37 determines a leakage in the hydronic heating system 11 if the amount of refilled water in a defined time period is above a threshold. The controller 37 may automatically close the outlet shut-off-valve 28 if a leakage is detected and may generate a warning signal.

The above leakage detection will avoid flooding or any other damage to the heating system or to a property. Monitoring the frequency of refilling and measuring the amount of refilled water allows leakage detection without any additional leakage sensor.

The above leakage detection may be accomplished by setting thresholds for the refilled amount of water. A threshold for one refilling cycle and a threshold for longer period of time (e.g. one week or one month) may be used.

If one of said leakage thresholds is reached during refilling, any other refilling may be stopped immediately and a warning message may be generated. The flow meter 35 integrated in the refilling device 11 is used for measuring the amount of refilled water. In addition to the above leakage alarming, long term data analysis may be performed. Analysis of the refilling frequency and the amount of water during each refilling cycle may be done and if an increasing trend in any of those two parameters is recognized, a warning message will be generated.

The controller 37 is adapted to transmit data to and to receive data from a data cloud. Through said data cloud the data may be provided to a cell phone of a customer.

The customer may receive the above warning massages through the cell phone and may then e.g. order a replacement for a softening and/or demineralization cartridge 26. Remote monitoring and/or preventive maintenance and/or predictive maintenance of the refilling device 11 may be provided through said cloud connectivity and data transfer functionality.

All elements of refilling device 11 are accommodated by or mounted to one single monolithic housing 21 providing a compact solution for residential and light commercial buildings where such a refilling device is used. Refilling of the hydronic heating system is automated by the refilling device 11. The controller 37 the refilling device 11 receives signals from the conductivity or TDS sensor 32, 33, from the temperature sensor 34, from the flow meter 35 and from the pressure sensor 36. The controller 37 processes said signals received from said sensors 32, 33, 34, 35, 36 to automatically control the operation of the refilling device 11. E.g., automated detection of hardness and/or mineralization of the untreated water eliminates user input for raw water type. Further e.g., providing data by RFID or NFC tag 38 eliminates user input for cartridge type.

LIST OF REFERENCE SIGNS 10 hydronic heating system
11 refilling device
12 water supply system
13 burner
14 supply pipe
15 radiator
16 return pipe
17 water supply pipe
18 water supply pipe
19 water tap
20 shower
21 housing
22 inlet port
23 outlet port
24 middle section
25 connection socket
26 softening and/or demineralization cartridge
27 inlet shut-off-valve
28 outlet shut-off-valve
29 system separator
30 backflow preventer
31 backflow preventer
32 conductivity or TDS sensor
33 conductivity or TDS sensor
34 temperature sensor
35 flow meter
36 pressure sensor
37 controller
38 RFID or NFC tag

The invention claimed is:

1. A refilling device for a hydronic heating system, the refilling device comprising:
a monolithic housing providing an inlet port, an outlet port, a middle section providing a flow channel extending between the inlet port and the outlet port and a connection socket for a softening and/or demineralization cartridge,
wherein the refilling device is connectable to a water supply pipe of a water supply system through the inlet port, and
wherein the refilling device is connectable to a water supply pipe of a hydronic heating system through the outlet port;
an inlet shut-off-valve at least partially accommodated within the monolithic housing downstream of the inlet port;
an automatically actuated outlet shut-off-valve at least partially accommodated within the monolithic housing upstream of the outlet port;
a system separator having backflow preventers at least partially accommodated within the monolithic housing;
a conductivity or TDS sensor at least partially accommodated within the monolithic housing, wherein the conductivity or TDS sensor is downstream of the connection socket and upstream of the automatically actuated outlet shut-off-valve;
a flow meter at least partially accommodated within the monolithic housing; and
a controller mounted to the monolithic housing,
wherein the controller is configured to receive signals from the conductivity or TDS sensor and from the flow meter, and
wherein the controller is configured to process the signals received from the sensors to automatically control the operation of the refilling device.

2. The refilling device as claimed in claim 1, wherein:
the inlet shut-off-valve is at least partially accommodated within the monolithic housing downstream of the inlet port,
the system separator having the backflow preventers is accommodated within the monolithic housing downstream of the inlet shut-off-valve,
the connection socket for the softening and/or demineralization cartridge is provided by the monolithic housing downstream of the system separator,
wherein the flow meter is positioned in the region of or within the connection socket for the softening and/or demineralization cartridge, and
the automatically actuated outlet shut-off-valve is at least partially accommodated within the monolithic housing downstream of the connection socket.

3. The refilling device as claimed in claim 1, further comprising:a pressure sensor at least partially accommodated within the monolithic housing,
wherein the pressure sensor is positioned downstream of the automatically actuated outlet shut-off-valve,
wherein the controller is configured to receive signals from the pressure sensor, and
wherein the controller is configured to process the signals received from the pressure sensor to automatically control the operation of the refilling device.

4. The refilling device as claimed in claim 3, wherein:
the pressure sensor is configured to measure the pressure within the outlet port through which the refilling device is connectable to the water supply pipe of the hydronic heating system,
the controller is configured to receive the pressure signal from the pressure sensor, and
the controller is configured to control the operation of the refilling device on basis of the pressure signal is such a way that the controller:

automatically opens the outlet shut-off-valve when the pressure signal from the pressure sensor is below a threshold, and automatically closes the outlet shut-off-valve when the pressure signal from the pressure sensor is above the threshold.

5. The refilling device as claimed in claim 1, further comprising:
a temperature sensor at least partially accommodated within the monolithic housing,
wherein the temperature sensor is positioned downstream of the inlet shut-off-valve, between the backflow preventers of the system separator,
wherein the controller is configured to receive signals from the temperature sensor, and
wherein the controller is configured to process the signals received from the temperature sensor to automatically control the operation of the refilling device.

6. The refilling device as claimed in claim 5, wherein the controller is configured to determine from the signal provided by the conductivity or TDS sensor and from the signal provided by the temperature sensor the hardness and/or mineralization of the water upstream of the connection socket.

7. The refilling device as claimed in claim 6, wherein the conductivity or TDS sensor is a second conductivity or TDS sensor, the refilling device further comprising a first conductivity or TDS sensor.

8. The refilling device as claimed in claim 7, wherein the controller is configured to determine from the signal provided by the second conductivity or TDS sensor and from the signal provided by the temperature sensor the hardness and/or mineralization of the water downstream of the connection socket.

9. The refilling device as claimed in claim 6, wherein the controller is configured to automatically close the outlet shut-off-valve on basis of the hardness and/or mineralization of the water upstream of the connection socket and/or on basis of the hardness and/or mineralization of the water downstream of the connection socket.

10. The refilling device as claimed in claim 6, further comprising a softening and/or demineralization cartridge connected to the connection socket,
wherein the softening and/or demineralization cartridge has a RFID or NFC tag storing data about the softening and/or demineralization cartridge,
wherein the controller is configured to receive the data from the RFID or NFC tag,
wherein the controller is configured to determine from the hardness and/or mineralization of the water upstream of the connection socket and from the data received from the RFID or NFC tag a nominal amount of water which can be softened and/or demineralized by the softening and/or demineralization cartridge,
wherein the controller is configured to determine from the signal provided by the flow meter an actual amount of water which has been softened and/or demineralized by the softening and/or demineralization cartridge, and
wherein the controller is configured to automatically generate a warning signal and/or automatically closes the outlet shut-off-valve if the difference between the nominal amount and the actual amount becomes smaller than a threshold.

11. The refilling device as claimed in claim 1, wherein the conductivity or TDS sensor is a second conductivity or TDS sensor, and wherein the refilling device further comprises a first conductivity or TDS sensor, wherein the first conductivity or TDS sensor is at least partially accommodated within the monolithic housing downstream of the inlet shut-off-valve and upstream of the system separator.

12. The refilling device as claimed in claim 1, further comprising a softening and/or demineralization cartridge connected to the connection socket,
wherein the softening and/or demineralization cartridge has a RFID or NFC tag storing data about the softening and/or demineralization cartridge,
wherein the controller is configured to receive the data from the RFID or NFC tag, and
wherein the controller is configured to process the data received from the RFID or NFC tag to automatically control the operation of the refilling device.

13. The refilling device as claimed in claim 12, wherein the controller is configured to automatically close the outlet shut-off-valve if the use of a wrong softening and/or demineralization cartridge is determined from the data received from the RFID or NFC tag.

14. The refilling device as claimed in claim 1, wherein:
the controller is configured to determine from the signal provided by flow meter the amount of water refilled into the hydronic heating system as a function of time,
the controller is configured to determine a leakage the hydronic heating system if the amount of water refilled into the hydronic heating system in a defined time period is above a threshold, and
the controller is configured to automatically generate a warning signal and/or automatically closes the outlet shut-off-valve if a leakage is detected.

15. The refilling device as claimed in claim 1, wherein the controller is adapted to transmit data to and to receive data from a data cloud, to provide remote monitoring and/or preventive maintenance and/or predictive maintenance of the refilling device.

16. A method of operating the refilling device as claimed in claim 1, the method comprising:
receiving signals from the conductivity or TDS sensor, and from the flow meter by the controller, and
processing the signals received from the sensors by the controller to automatically control the operation of the refilling device by the controller.

17. A refilling device for a hydronic heating system, the refilling device comprising:
a monolithic housing providing an inlet port, an outlet port, a middle section providing a flow channel extending between the inlet port and the outlet port and a connection socket for a softening and/or demineralization cartridge,
wherein the refilling device is connectable to a water supply pipe of a water supply system through the inlet port, and
wherein the refilling device is connectable to a water supply pipe of a hydronic heating system through the outlet port;
an inlet shut-off-valve at least partially accommodated within the monolithic housing downstream of the inlet port;
an automatically actuated outlet shut-off-valve at least partially accommodated within the monolithic housing upstream of the outlet port;
a system separator having backflow preventers at least partially accommodated within the monolithic housing;
a first conductivity or TDS sensor;
a second conductivity or TDS sensor at least partially accommodated within the monolithic housing downstream of the connection socket and upstream of the automatically actuated outlet shut-off-valve;

a temperature sensor at least partially accommodated within the monolithic housing and downstream of the inlet shut-off-valve and between the backflow preventers of the system separator, a flow meter at least partially accommodated within the monolithic housing; and a controller mounted to the monolithic housing,
wherein the controller is configured to receive signals from the temperature sensor, from at least one of the first conductivity or TDS sensor or the second conductivity or TDS sensor, and from the flow meter,
wherein the controller is configured to determine from the signal provided by the at least one of the first conductivity or TDS sensor or the second conductivity or TDS sensor, and from the signal provided by the temperature sensor, the hardness and/or mineralization of the water upstream of the connection socket, and
wherein the controller is configured to process the signals from the at least one of the first conductivity or TDS sensor, the second conductivity or TDS sensor, the flow meter, or the temperature sensor to automatically control the operation of the refilling device.

18. The refilling device of claim 17, wherein the first conductivity or TDS sensor is at least partially accommodated within the monolithic housing downstream of the inlet shut-off-valve and upstream of the system separator.

19. A refilling device for a hydronic heating system, the refilling device comprising:

a monolithic housing providing an inlet port, an outlet port, a middle section providing a flow channel extending between the inlet port and the outlet port, and a connection socket,
wherein the refilling device is connectable to a water supply pipe of a water supply system through the inlet port, and
wherein the refilling device is connectable to a water supply pipe of a hydronic heating system through the outlet port;

an inlet shut-off-valve at least partially accommodated within the monolithic housing downstream of the inlet port;

an automatically actuated outlet shut-off-valve at least partially accommodated within the monolithic housing upstream of the outlet port;

a system separator having backflow preventers at least partially accommodated within the monolithic housing;

a conductivity or TDS sensor at least partially accommodated within the monolithic housing;

a temperature sensor at least partially accommodated within the monolithic housing and downstream of the inlet shut-off-valve and between the backflow preventers of the system separator, a flow meter at least partially accommodated within the monolithic housing;

a softening and/or demineralization cartridge connected to the connection socket, wherein the softening and/or demineralization cartridge has a RFID or NFC tag storing data about the softening and/or demineralization cartridge; and a controller mounted to the monolithic housing,
wherein the controller is configured to receive signals from the temperature sensor, from the conductivity or TDS sensor, and from the flow meter, and to receive the data from the RFID or NFC tag,
wherein the controller is configured to determine from the signal provided by the conductivity or TDS sensor and from the signal provided by the temperature sensor, the hardness and/or mineralization of the water upstream of the connection socket,
wherein the controller is configured to determine from the hardness and/or mineralization of the water upstream of the connection socket and from the data received from the RFID or NFC tag a nominal amount of water which can be softened and/or demineralized by the softening and/or demineralization cartridge,
wherein the controller is configured to determine from the signal provided by the flow meter an actual amount of water which has been softened and/or demineralized by the softening and/or demineralization cartridge,
wherein the controller is configured to automatically generate a warning signal and/or automatically closes the outlet shut-off-valve if the difference between the nominal amount and the actual amount becomes smaller than a threshold, and
wherein the controller is configured to process the signals from at least one of the conductivity or TDS sensor, the flow meter, the temperature sensor, or the RFID or NFC tag to automatically control the operation of the refilling device.

20. The refilling device of claim 19, wherein the conductivity or TDS sensor is downstream of the inlet shut-off-valve and upstream of the system separator.

* * * * *